United States Patent
Huang et al.

(10) Patent No.: US 11,221,082 B2
(45) Date of Patent: Jan. 11, 2022

(54) 3-IN-1 AIR VALVE ASSEMBLY

(71) Applicant: BESTWAY INFLATABLES & MATERIAL CORP., Shanghai (CN)

(72) Inventors: Shuiyong Huang, Shanghai (CN); Wanbin Qiu, Shanghai (CN); Qiao Zhao, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 0 days.

(21) Appl. No.: 16/610,824

(22) PCT Filed: May 4, 2017

(86) PCT No.: PCT/CN2017/082992
§ 371 (c)(1),
(2) Date: Nov. 4, 2019

(87) PCT Pub. No.: WO2018/201371
PCT Pub. Date: Nov. 8, 2018

(65) Prior Publication Data
US 2020/0056711 A1  Feb. 20, 2020

(51) Int. Cl.
*F16K 15/20* (2006.01)
*A47C 27/08* (2006.01)
*F16K 15/14* (2006.01)

(52) U.S. Cl.
CPC .......... *F16K 15/205* (2013.01); *F16K 15/202* (2013.01); *A47C 27/082* (2013.01); *F16K 15/147* (2013.01); *F16K 15/148* (2013.01)

(58) Field of Classification Search
CPC .... F16K 15/148; F16K 15/202; F16K 15/205; Y10T 137/3584; Y10T 137/374
See application file for complete search history.

(56) References Cited

U.S. PATENT DOCUMENTS

| 4,924,899 A | 5/1990 | Tsai | |
| 5,203,831 A * | 4/1993 | Lind | B63C 9/24 137/1 |

(Continued)

FOREIGN PATENT DOCUMENTS

| CN | 1397442 A | 2/2003 |
| CN | 2618018 | 5/2004 |

(Continued)

OTHER PUBLICATIONS

Extended European Search Report dated Dec. 1, 2020 (Dec. 1, 2020) on related European patent application EP17908746.5 by the European Patent Office.

(Continued)

*Primary Examiner* — Kevin F Murphy
(74) *Attorney, Agent, or Firm* — Dickinson Wright PLLC (57) ABSTRACT

An air valve assembly for use with inflatable articles is provided. The air valve assembly includes a valve base (10), a valve body (20), an inflation adapter (30), a plug (40) and a fixing ring (50). The air valve assembly provides for inflation of the inflatable article through two different sized air passages, allowing inflation by multiple sizes of air inflation hoses or nozzles. The air valve assembly also provides for quick deflation of the inflatable article through a third and larger sized air passage. The configuration of the air valve assembly may be easily changed by hand without the need for tools, allowing for easy and efficient inflation or deflation of the inflatable article.

13 Claims, 8 Drawing Sheets

(56) References Cited

U.S. PATENT DOCUMENTS

| | | | | |
|---|---|---|---|---|
| 5,343,889 A * | 9/1994 | Jaw | ............... | F16K 15/202 |
| | | | | 137/232 |
| 6,164,314 A * | 12/2000 | Saputo | ............ | F16K 15/202 |
| | | | | 137/232 |
| 6,648,004 B2 * | 11/2003 | Lau | ................ | F16K 15/148 |
| | | | | 137/223 |
| 6,814,639 B1 | 11/2004 | Peterson | | |
| 8,584,695 B2 * | 11/2013 | Lau | ................ | F16K 15/202 |
| | | | | 137/232 |
| 2005/0109398 A1 | 5/2005 | Huang | | |
| 2008/0223449 A1 * | 9/2008 | Culp | ............. | F16K 15/205 |
| | | | | 137/232 |
| 2016/0223095 A1 * | 8/2016 | Sando | ............ | F16K 15/20 |

FOREIGN PATENT DOCUMENTS

| | | | | |
|---|---|---|---|---|
| CN | 1530578 | | 9/2004 | |
| CN | 201391652 Y | | 1/2010 | |
| CN | 202056364 | | 11/2011 | |
| CN | 204164459 U | | 2/2015 | |
| CN | 206001065 U | | 3/2017 | |
| WO | 0218825 | | 3/2002 | |
| WO | WO-2005116496 A1 * | 12/2005 | ........... | F16K 15/202 |

OTHER PUBLICATIONS

First Chinese Office Action dated Dec. 21, 2020 (Dec. 21, 2020) on related Chinese patent application 201780088929.6 by The State Intellectual Property Office of People's Republic of China.
Second Office Action dated Jul. 9, 2021 (Jul. 9, 2021) issued on related Chinese patent application 201780088929.6 by the State Intellectual Property Office of People's Republic of China.

\* cited by examiner

3-IN-1 AIR VALVE ASSEMBLY

CROSS-REFERENCE TO RELATED APPLICATION

This application is a 35 U.S.C. § 371 national stage application of PCT Application Ser. No. PCT/CN2017/082992, filed on May 4, 2017, which is hereby incorporated by reference in its entirety and for which priority is claimed for the present application.

TECHNICAL FIELD

The present disclosure relates to an air valve assembly for an inflatable article, and more particularly to an air valve assembly that allows for multiple sizes of inflation inputs and rapid deflation of the inflatable article.

BACKGROUND

Air valves for inflatable articles such as inflatable pools, inflatable boats, inflatable toys and inflatable furniture are known. A user typically inflates the article through an air valve using an air compressor, a foot pump or a hand pump. The user also may deflate the article through the same air valve. One type of such an air valve is generally molded from a deformable plastic or vinyl material and fastened to the inflatable article by a high frequency or heat welding method. This typical air valve has a valve block that defines an air passage, a one-way valve flap connected on the inside of the valve block in order to open/close the air passage, and a valve plug that plugs into the valve block to seal the air passage. To deflate the inflated article, this valve structure requires that the valve plug be disengaged from the valve block and the valve block deformed from manual force applied by the user in order to open the valve flap in the air passage, thus allowing the air inside to escape through the air passage. Further, the user must maintain the manual force on the valve block to maintain the deformed position of the valve block until the air is satisfactorily exhausted from the inflatable article.

Conventional air valves have other drawbacks. For example, conventional air valves may have low inflation and deflation efficiency due to the structure of the air passage. Conventional air valves may also have only one inflation inlet or opening, thus requiring one specific size/configuration of pump or air hose for inflation of the inflatable article. As another example, conventional air valves may have a complicated structure that significantly increases costs. Conventional air valves may also be difficult to manipulate or use during inflation or deflation of the inflatable article, or may include structures that are prone to damage, wear, jamming or other failures that prevent proper operation.

The present disclosure is intended to solve the limitations of conventional air valves discussed above and other problems, and to provide advantages and aspects not provided by prior air valves. Some of the features and advantages of the present disclosure are described in the following detailed description and the accompanying drawings.

SUMMARY

One or more embodiments of the present disclosure are directed to an air valve assembly for use with an inflatable article. The air valve assembly includes a valve base having a first hollow tube member that defines a deflation air passage. The air valve assembly also includes a valve body having a second hollow tube member defining an inflation air passage, the second hollow tube member being disposed at least partially within the first hollow tube member. The air valve assembly further includes a valve cap disposed on a first end of the second hollow tube member, the valve cap having a first inflation opening. The air valve assembly also includes a valve plate disposed in the second hollow tube member, the valve plate configured to open and close the inflation air passage. The air valve assembly further includes an inflation adapter having a third hollow tube member configured to be inserted through the first inflation opening, the inflation adapter having a second inflation opening.

The air valve assembly may include a plug configured to plug into the second inflation opening. The valve base may include a first annular flange connected with the first hollow tube member, the first annular flange configured to connect the air valve assembly to the inflatable article. The first annular flange may be connected to the inflatable article by either a high-frequency weld, heat or glue. The first annular flange may be formed from a soft thermoplastic material, such as PVC. The valve base may include a first thread disposed on an inner surface of the first hollow tube member. The valve body may include a second annular flange disposed on the outside of the first end of the second hollow tube member. The valve body may include a second thread disposed on an outer surface of the second end of the second hollow tube member, the second thread configured to engage with the first thread The valve cap may be connected to the second end of the second hollow tube member by a fastening member. The fastening member may include a first hook connected on the valve cap, wherein the first hook hooks onto a bottom surface of the second annular flange to fix the valve cap on the second hollow tube member. The valve body may include an abutment mount disposed in the second hollow tube member. The valve plate may include a shaft inserted through the abutment mount and the plug may be connected with the inflation adapter. The air valve assembly may include a third annular flange disposed on an end of the third hollow tube member and a fourth annular flange disposed on an end of the plug. The third annular flange may be connected to the fourth annular flange by a first connecting strap. The valve base may include a fifth annular flange disposed on the outside of the first end of the first hollow tube member.

The air valve assembly may include a fixing ring having a ring portion disposed around the first hollow tube member and between the first and fifth annular flanges, and a second connecting strap attached on the ring portion and connected to the first connecting strap. The second connecting strap may be detachably connected to the first connecting strap by a connecting mechanism. The connecting mechanism may include a hole disposed on an end of the first connecting strap, a raised block and a second hook disposed on an end of the second connecting strap, where the raised block is configured to be inserted in the hole. The valve cap may include a fixing hole, where the first and second connecting straps are inserted through the fixing hole, and the second hook hooks on the fixing hole.

Other features and advantages of an aspect of the disclosure will be apparent from the following specification, taken in conjunction with the following drawings.

DETAILED DESCRIPTION

This disclosure may take many different forms. The current description and drawings teach only a few of the many different forms or embodiments of the invention. It should be understood that the present disclosure is to be considered as disclosing only a few, non-limiting examples of the principles of the invention. This disclosure is not intended to limit the broadest aspects of the invention to the illustrated embodiments.

Figure 10:
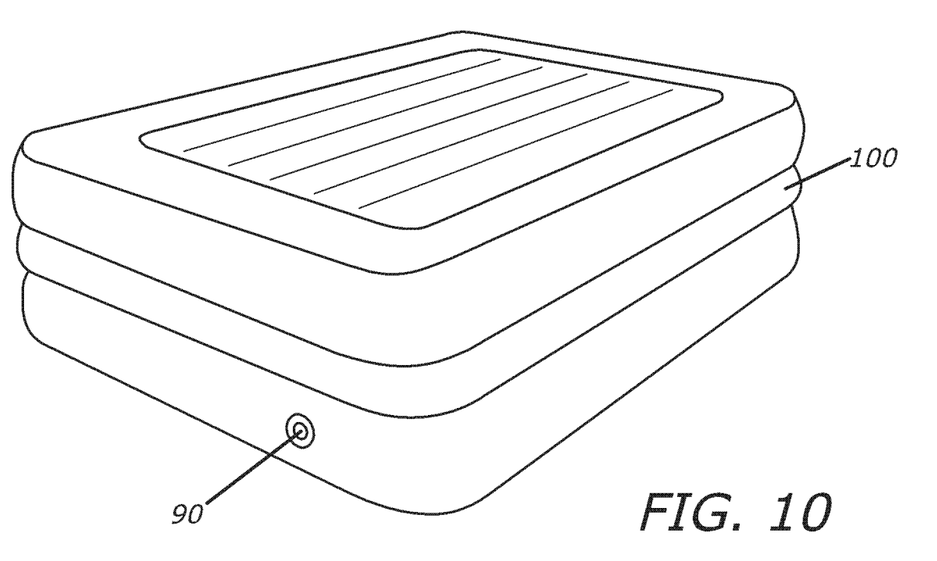
FIG. 10 is a perspective view of an inflatable article having the air valve assembly of FIG. 1.

FIGS. 1-9 illustrate an air valve assembly 90 for use with an inflatable article, such as an inflatable mattress (see FIG. 10). The air valve assembly 90 is a 3-in-1 assembly providing for inflation through two sizes of apertures and deflation through another size aperture. The air valve assembly 90 may include a valve base 10, a valve body 20, an inflation adapter 30, a plug 40 and a fixing ring 50, which together provide a compact and versatile valve assembly for quick and efficient inflation/deflation of the inflatable article.

The valve base 10 has a first hollow tube member 11, the interior of which defines a deflation air passage 12 for rapid deflation of the inflatable article. As such, the deflation air passage 12 may be the largest diameter air passage of the air valve assembly 90. The valve base 10 also has an annular flange 13 disposed around the circumference of the first hollow tube member 11, the first annular flange 13 configured to engage and seal with the surface material of the inflatable article. The first hollow tube member 11 may extend through a hole or opening in the material of the inflatable article and the annular flange 13 may be fastened or sealingly mated with material of the inflatable article around the opening, such as with a high-frequency welding process or glue, for example. The valve base 10 may also have a first thread 14 disposed on the inside surface of the first hollow tube member 11.

The valve body 20 has a second hollow tube member 21 that is sized and configured for at least a portion of the second hollow tube member 21 to fit within the first hollow tube member 11. The second hollow tube member 21 defines an inflation air passage 22 that may be smaller in diameter than the deflation air passage 12. A second thread 26 is disposed on the exterior surface of the second hollow tube member 21, such as on the outside of one end of the second hollow tube member 21, for example. The second thread 26 of the second hollow tube member 21 is configured to engage and mate with the first thread 14 of the first hollow tube member 11, detachably coupling the first and second hollow tube members 11, 21 together.

The valve body 20 also includes a second annular flange 25 disposed on the outside surface of the second hollow tube member 21. For example, the second annular flange 25 may be disposed on a first end of the second hollow tube member 21 and the second thread 26 may be disposed on a second end of the second hollow tube member 21. The valve body 20 may also include an abutment mount 27 disposed within the second hollow tube member 21. Here, the abutment mount 27 may be flush with the threaded end (e.g., second thread 26) of the second hollow tube member 21. The abutment mount 27 is sized and configured to receive a shaft 241 of a valve plate 24 so that the valve plate 24 may butt up against the abutment mount 27 in a closed position. A sealing member 60 (e.g., O-ring) may be disposed between the abutment mount 27 and the valve plate 24 to provide an air seal when the valve plate 24 is in the closed position. When an inflation nozzle is inserted into the air valve assembly 90, a part of the inflation pump 95 may push on the end of the shaft 241, causing the valve plate 24 to move away from the abutment mount 27 into an open position. This movement of the valve plate 24 breaks the air seal, thus allowing air to be forced in through the inflation air passage 22 from the inflation pump 95 and to inflate the inflatable article.

A valve cap 23 defining a first inflation opening 231 may be disposed on the first or non-threaded end of the second hollow tube member 21. The first inflation opening 231 provides an opening for receiving a first size of inflation nozzle or hose. The valve cap 23 may have one or more fastening members 233 (e.g., first hooks), where the fastening members 233 engage with (e.g., hook onto) a surface of the second annular flange 25 to fasten the valve cap 23 to the second hollow tube member 21. For example, the valve cap 23 may include three hooks 233 spaced around the inner circumference of the valve cap 23, the three hooks 233 each hooking onto a bottom surface of the second annular flange 25, thereby fastening the valve cap 23 to the second annular flange 25. A sealing member 60, such as an O-ring, may be disposed between the valve cap 23 and the second annular flange 25 to provide an air seal. The valve cap 23 may also include a fixing hole 232 (e.g., strap connector) to provide an anchor for a detachable strap.

As shown in FIGS. 1-9, the inflation adapter 30 may include a third hollow tube member 31 that defines a second inflation opening 32. The third hollow tube member 31 is configured to be received by the first inflation opening 231 of the valve cap 23. For example, the third hollow tube member 31 of the inflation adapter 30 may be inserted into the first inflation opening 231. The second inflation opening 32 provides an opening sized differently than the first inflation opening 231 to allow for receiving a second size of inflation nozzle or hose. Thus, the different sizes of the first and second inflation openings 231, 32 provide for the air valve assembly 90 to be able to operate with multiple sizes of inflation nozzles. A third annular flange 33 may be disposed at one end of the third hollow tube member 31.

The plug 40 may be sized and configured to fit into the second inflation opening 32, thereby plugging and sealing the air valve assembly 90 when not in use. A fourth annular flange 41 may be disposed on one end of the plug 40. The plug 40 may be flexibly connected to the inflation adapter 30, such as by a portion of a first connecting strap 34, for example. Here, the connecting portion of the first connecting strap 34 may be connected directly to the third and fourth annular flanges 33, 41. Another portion of the first connecting strap 34 may be configured to be inserted into the fixing hole 232 of the valve cap 23. Thus, the combination of the inflation adapter 30 and the plug 40 may be attached to the valve cap 23 in order to remain integral with the air valve assembly 90 and eliminate the need to have separate unattached pieces that can get lost or misplaced.

The valve base 10 may have a fifth annular flange 15 disposed around an end (e.g., outside end of the first end) of the first hollow tube member 11. A fixing ring 50 having a ring portion 51 may be disposed around the outer surface of the first hollow tube member 11, such as between the first and fifth annular flanges 13, 15, for example. The fixing ring 50 may also include a second connecting strap 52 connected or attached to the ring portion 51. The second connecting strap 52 may be attached to the first connecting strap 34. For example, the first and second connecting straps 34, 52 may be detachably connected by a connecting assembly 55.

The connecting assembly 55 may include a hole 35 disposed on an end of the first connecting strap 34, and a raised block 53 and a second hook 54 both disposed on an end of the second connecting strap 52. The raised block 53 on the second connecting strap 52 may be configured to be received by (e.g., inserted into) the hole 35 on the first connecting strap 34, thus detachably fastening the first and second connecting straps 34, 52 together. The first and second connecting straps 34, 52 may be received by (e.g., inserted into) the fixing hole 232 and the second hook 54 may engage or hook onto the fixing hole 232, thus fastening the combined first and second connecting straps 34, 52 to the valve cap 23. Accordingly, the inflation adapter 30, the plug 40 and the fixing ring 50 may be detachably fastened to the valve cap 23, keeping the various components together in an integrated assembly.

Figure 1:
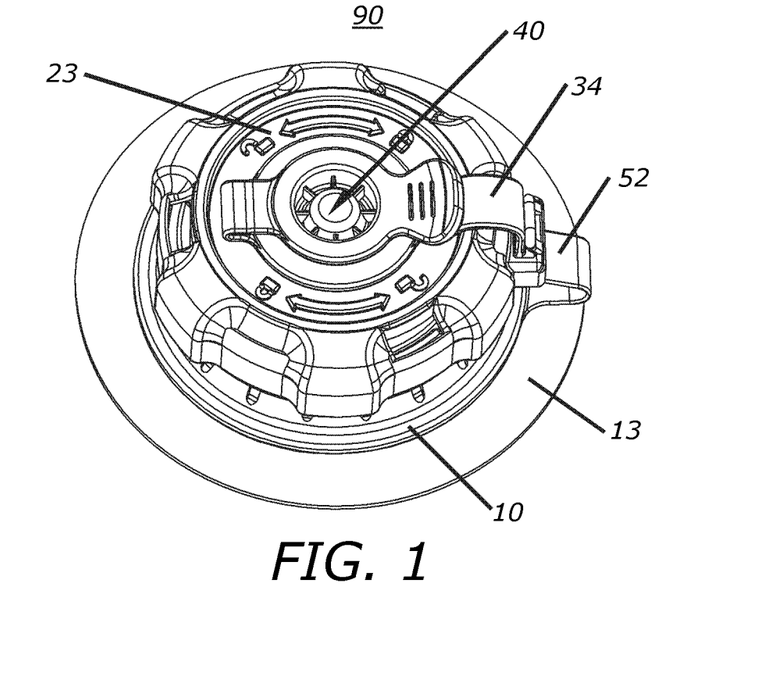
FIG. 1 is a perspective view of an air valve assembly in a closed configuration.
Figure 2:
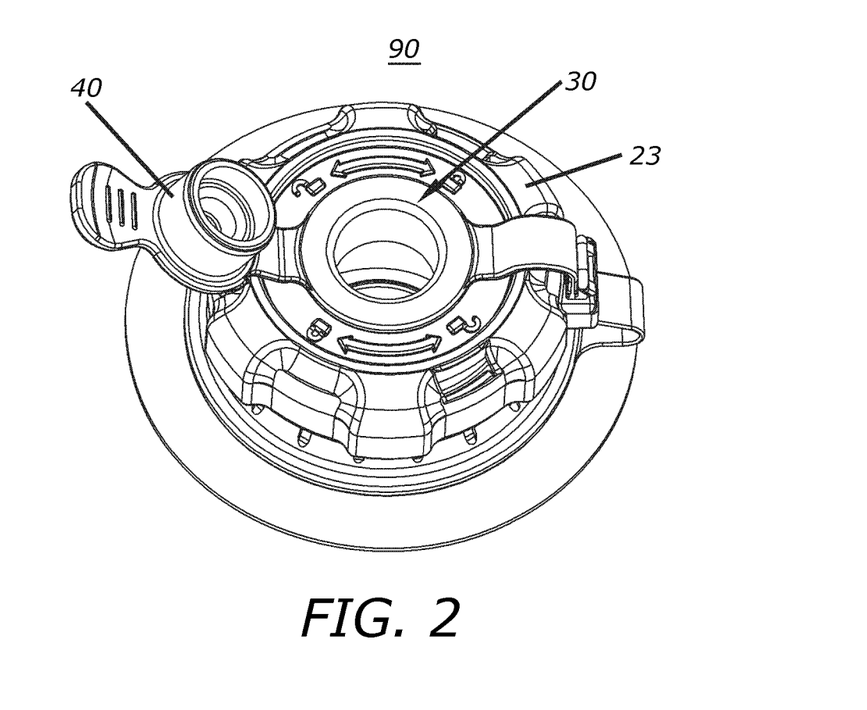
FIG. 2 is a perspective view of the air valve assembly of FIG. 1 in a first open configuration.
Figure 3:
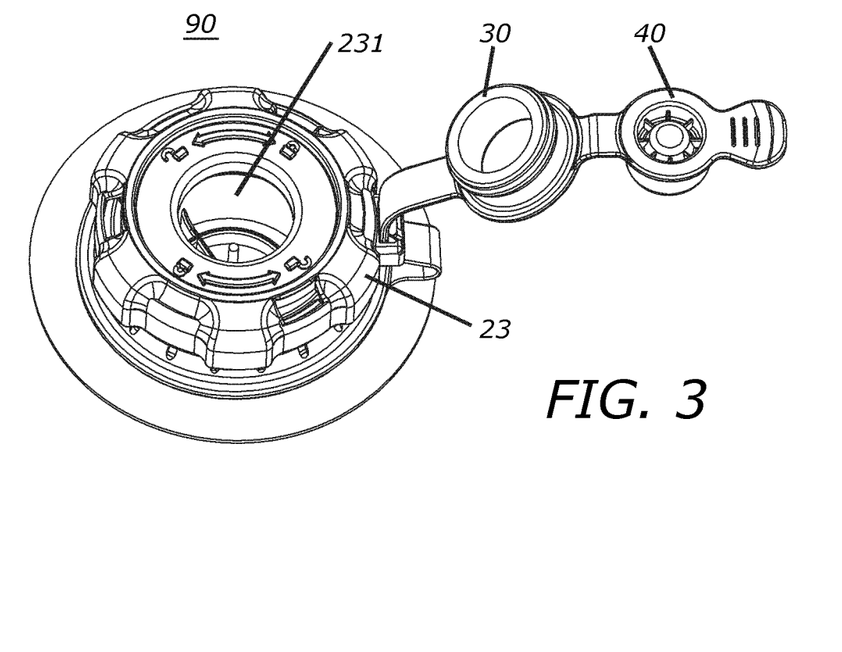
FIG. 3 is a perspective view of the air valve assembly of FIG. 1 in a second open configuration.
Figure 4:
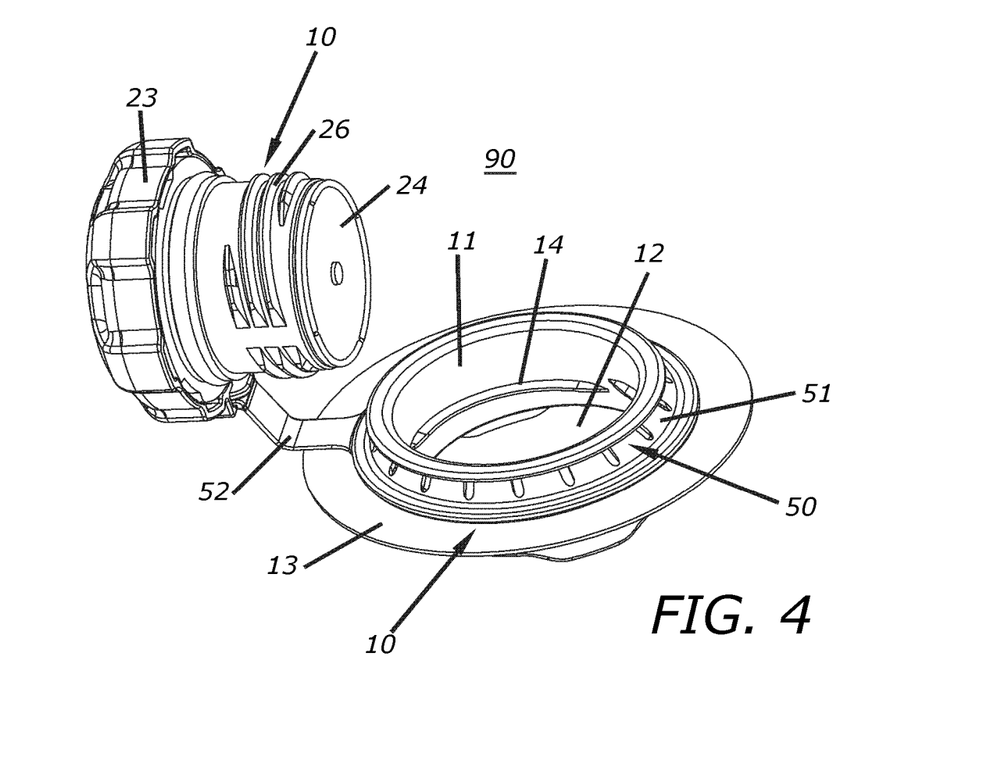
FIG. 4 is a perspective view of the air valve assembly of FIG. 1 in a third open configuration.
Figure 5:
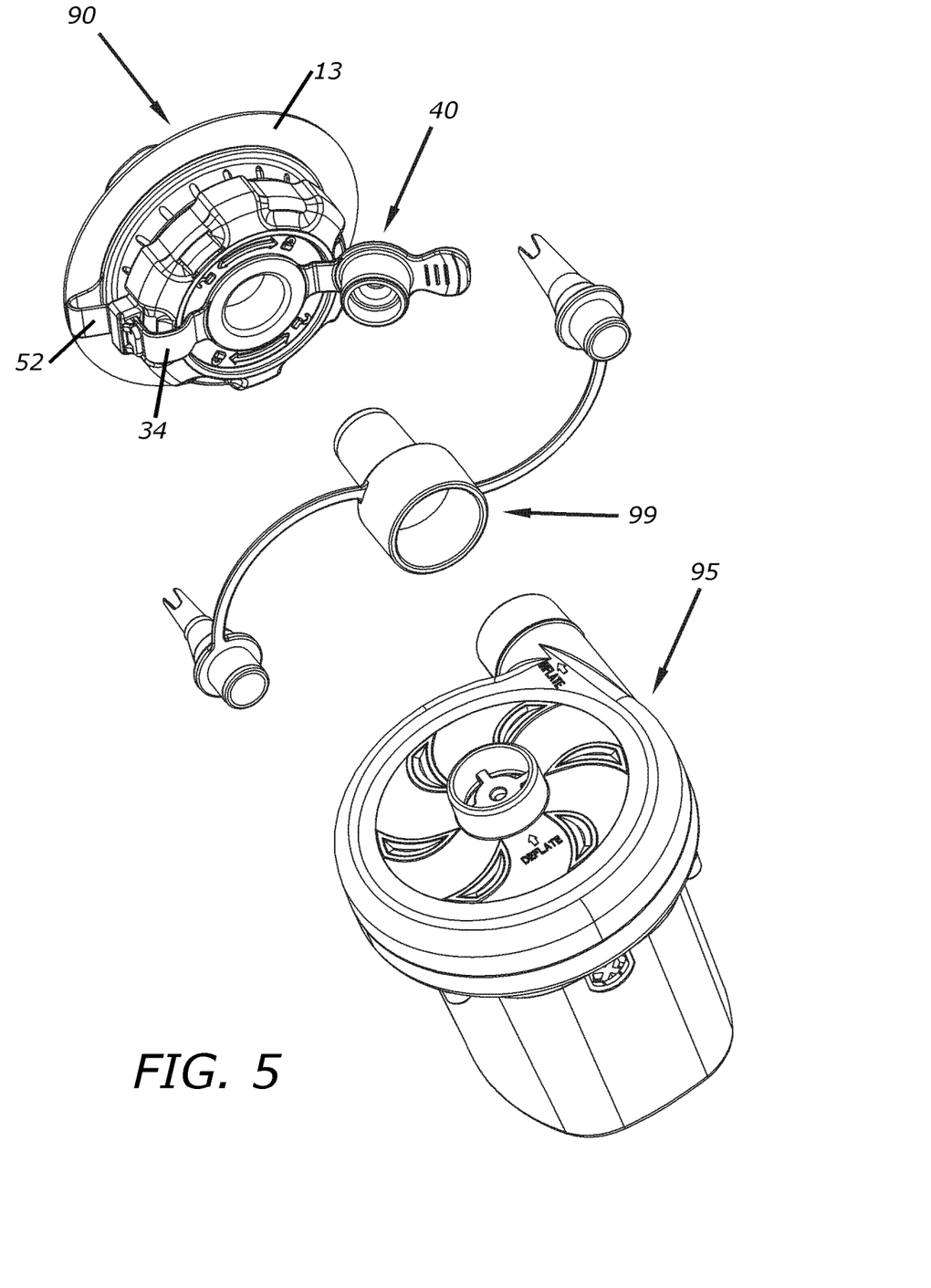
FIG. 5 is a perspective view of the air valve assembly of FIG. 2 with an air pump and air pump adapter.
Figure 6:
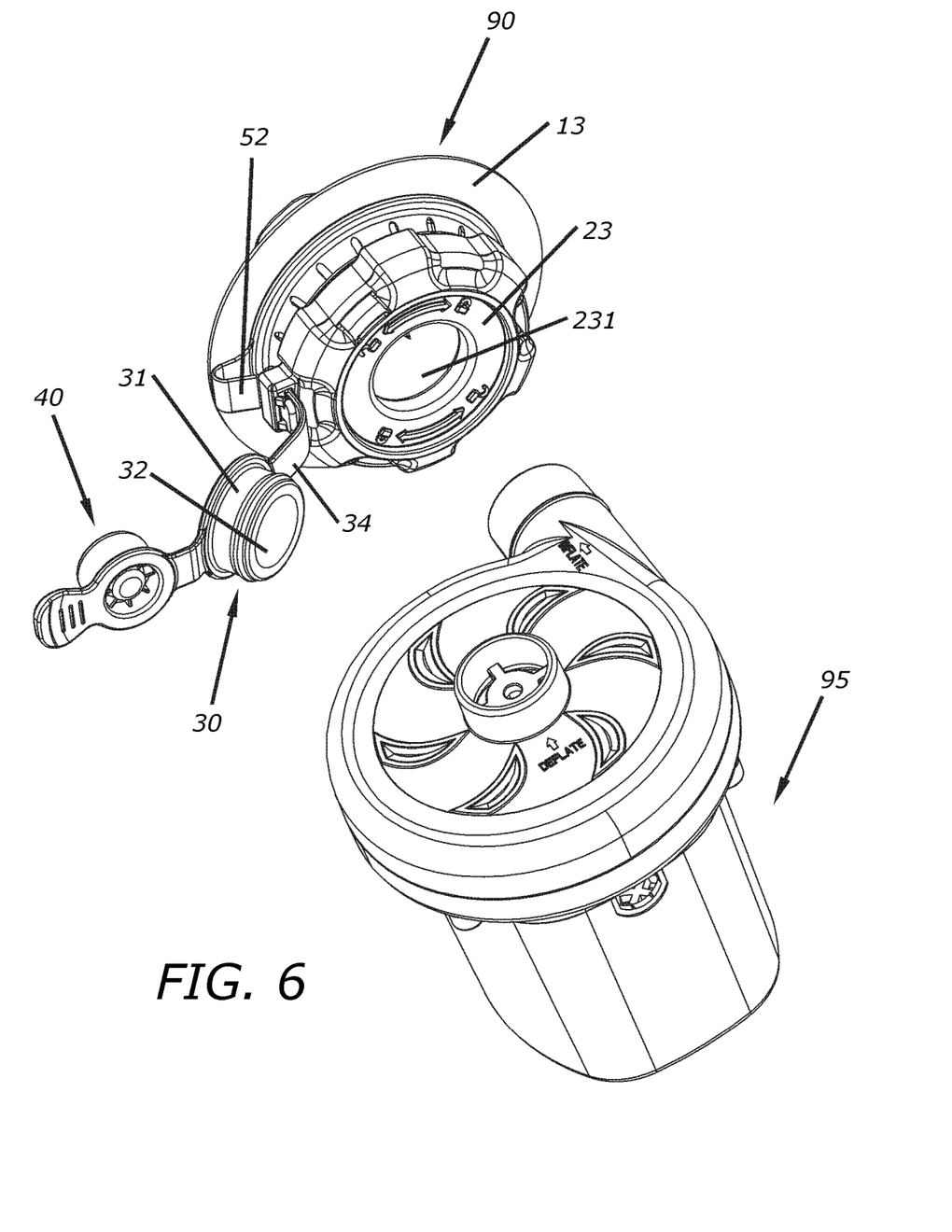
FIG. 6 is a perspective view of the air valve assembly of FIG. 3 with an air pump.
Figure 7:
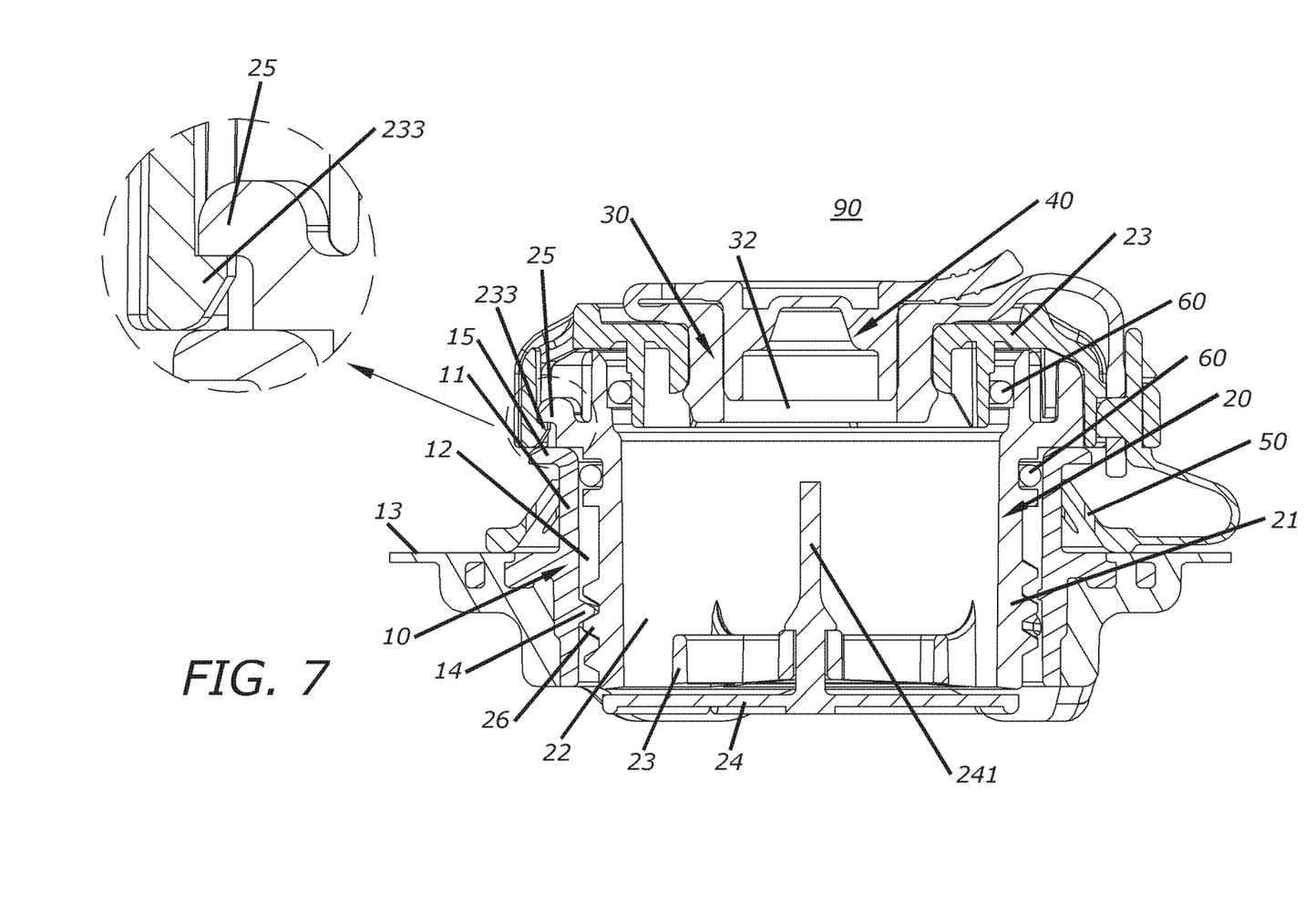
FIG. 7 is a cross-sectional front view of the air valve assembly of FIG. 1.
Figure 8:
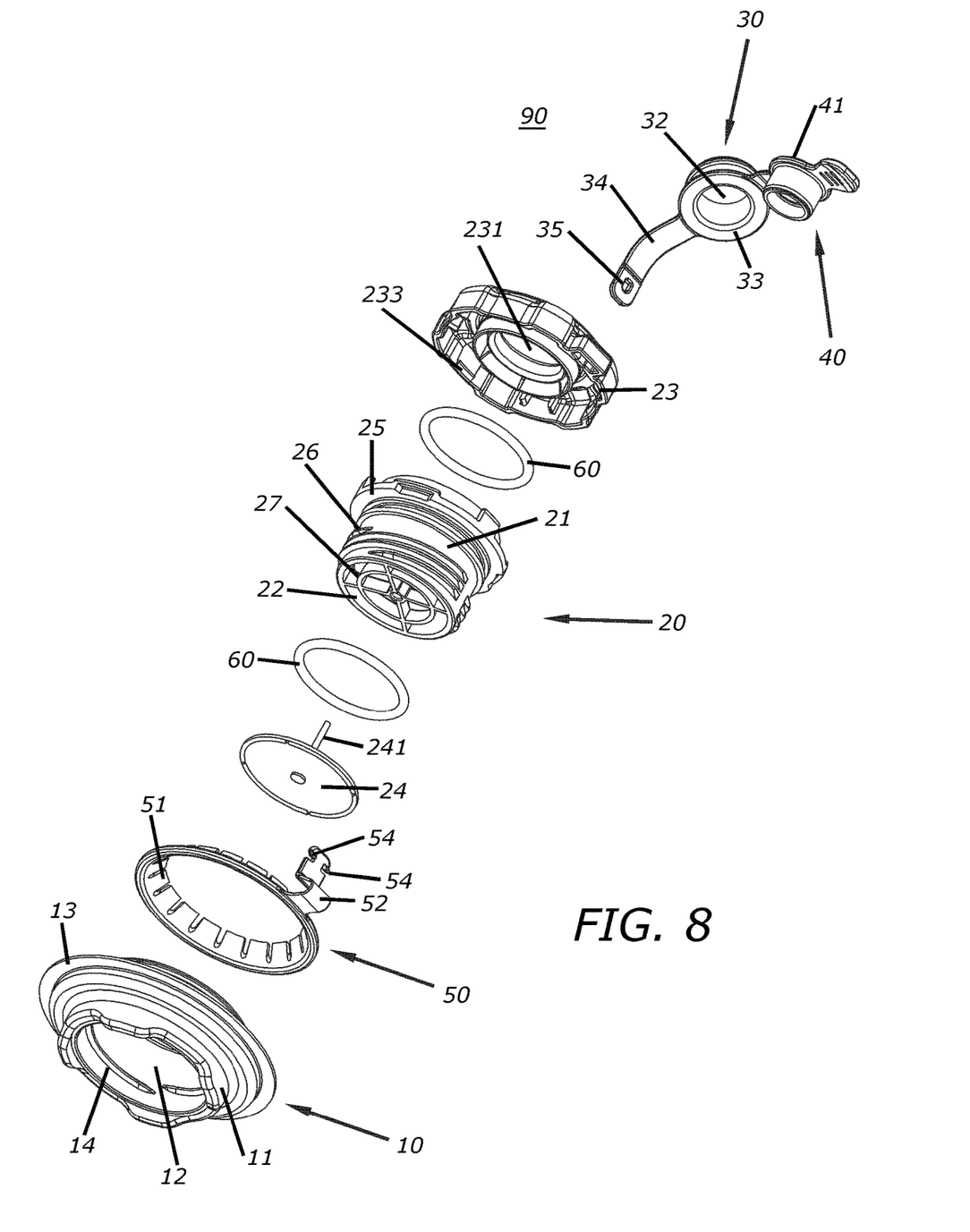
FIG. 8 is an exploded perspective view of the air valve assembly of FIG. 3.
Figure 9:
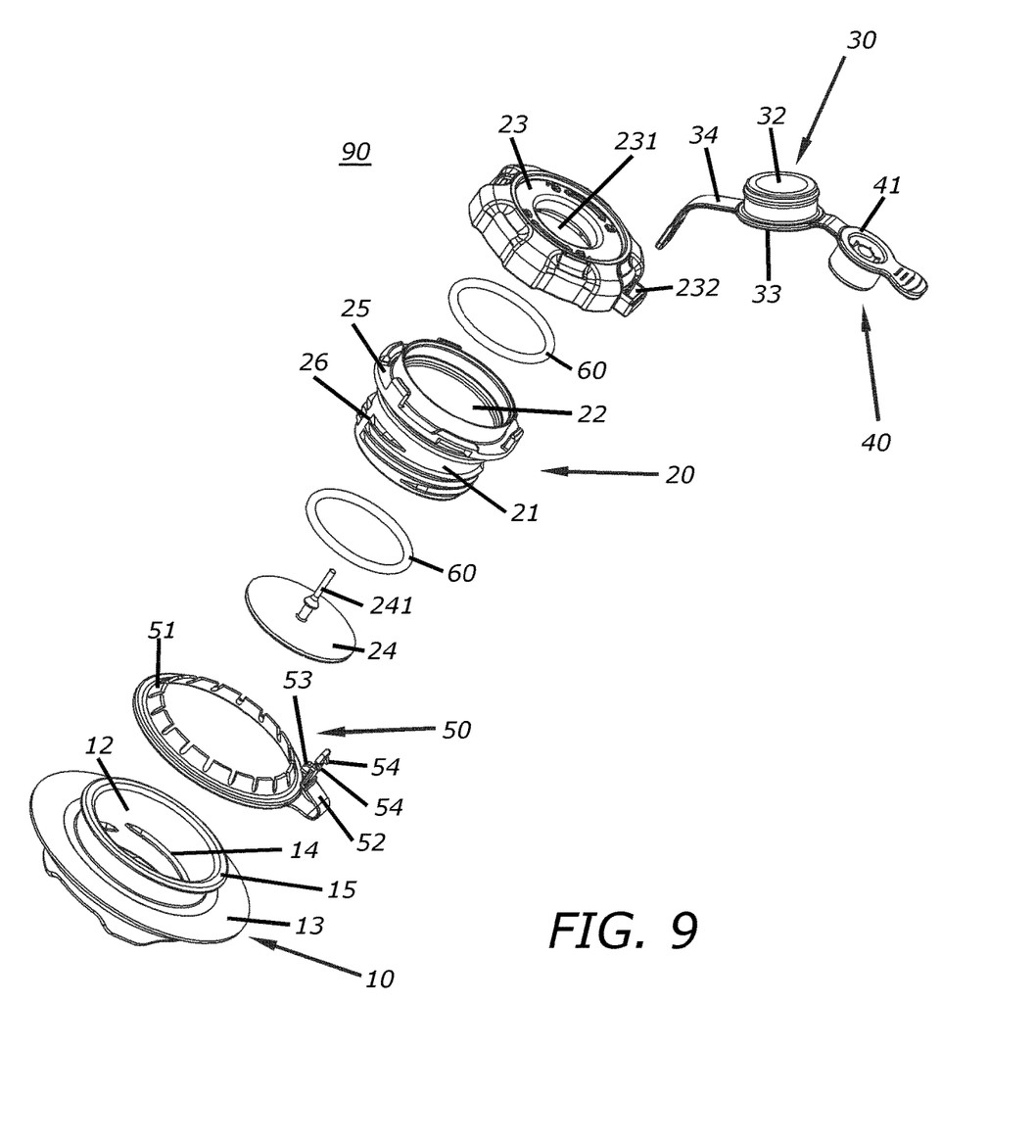
FIG. 9 is another exploded perspective view of the air valve assembly of FIG. 3.

As illustrated in FIG. 6, an output nozzle of the inflation pump 95 may be sized and configured to interface directly with the first inflation opening 231 of the valve body 20. As illustrated in FIG. 5, an air pump adapter 99 may be sized and configured to couple the output nozzle of the inflation pump 95 with the second inflation opening 32 of the inflation adapter 30.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to as falling within the scope of the invention.

The invention claimed is:

1. An air valve assembly for use with an inflatable article, the air valve assembly comprising:
    a valve base comprising a first hollow tube member defining a deflation air passage;
    a valve body comprising a second hollow tube member disposed at least partially within the first hollow tube member and defining an inflation air passage within the deflation air passage;
    a valve cap disposed on an outer end of the second hollow tube member and defining a first inflation opening at least partially within the inflation air passage;
    a valve plate disposed in the second hollow tube member and configured to open and close the inflation air passage;
    an inflation adapter configured to be inserted through the first inflation opening, the inflation adapter comprising a third hollow tube member defining a second inflation opening at least partially within the first inflation opening;
    a plug configured to plug the second inflation opening;
    a plurality of annular flanges comprising:
        a first annular flange connected with the first hollow tube member,
        a second annular flange disposed on an outside of the outer end of the second hollow tube member,
        a third annular flange disposed on an end of the third hollow tube member, and
        a fourth annular flange disposed on an end of the plug; and
    a first connecting strap connecting the third annular flange to the fourth annular flange.

2. The air valve assembly of claim 1, wherein the first annular flange comprises PVC.

3. The air valve assembly of claim 1, the valve base further comprising first threading disposed on an inner surface of the first hollow tube member.

4. The air valve assembly of claim 3, the valve body further comprising second threading disposed on an outside surface of an inner end of the second hollow tube member, the second threading configured to engage with the first threading.

5. The air valve assembly of claim 1, the valve body further comprising a second annular flange disposed on an outside of the outer end of the second hollow tube member.

6. The air valve assembly of claim 5, wherein the valve cap is detachably connected to the outer end of the second hollow tube member.

7. The air valve assembly of claim 5, further comprising a fastening member connecting the valve cap to the outer end of the second hollow member.

8. The air valve assembly of claim 1, the valve body further comprising an abutment mount disposed in the second hollow tube member.

9. The air valve assembly of claim 8, the valve plate comprising a shaft inserted through the abutment mount.

10. The air valve assembly of claim 1, the plurality of annular flanges further comprising: a fifth annular flange disposed on an outside of an outer end of the first hollow tube member.

11. The air valve assembly of claim 10, comprising:
    a fixing ring comprising:
        a ring portion disposed around the first hollow tube member and between the first annular flange and the fifth annular flange; and
        a second connecting strap connected to the ring portion and the first connecting strap.

12. The air valve assembly of claim 11, further comprising a connecting mechanism detachably connecting the second connecting strap to the first connecting strap, the connecting mechanism comprising:
    a raised block disposed on an end of the second connecting strap and configured to engage with a hole in an end of the first connecting strap.

13. The air valve assembly of claim 12, the valve cap having a fixing hole therein, wherein the first connecting strap and the second connecting straps are both inserted through the fixing hole, and wherein the connecting mechanism further comprises a hook disposed on an end of the second connecting strap and configured to engage with the fixing hole.

* * * * *